US008351455B2

(12) United States Patent
Tang et al.

(10) Patent No.: US 8,351,455 B2
(45) Date of Patent: Jan. 8, 2013

(54) SYSTEM AND METHOD FOR MULTI-STAGE ZERO FORCING BEAMFORMING IN A WIRELESS COMMUNICATIONS SYSTEM

(75) Inventors: Yang Tang, San Diego, CA (US); Young Hoon Kwon, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 802 days.

(21) Appl. No.: 12/418,476

(22) Filed: Apr. 3, 2009

(65) Prior Publication Data
US 2009/0252091 A1 Oct. 8, 2009

Related U.S. Application Data

(60) Provisional application No. 61/042,675, filed on Apr. 4, 2008.

(51) Int. Cl.
*H04J 3/16* (2006.01)
*H04L 12/26* (2006.01)
*H04L 1/00* (2006.01)

(52) U.S. Cl. ......... 370/437; 370/252; 370/329; 370/341
(58) Field of Classification Search .......................... None
See application file for complete search history.

(56) References Cited

U.S. PATENT DOCUMENTS

| 7,336,727 | B2 | 2/2008 | Mukkavilli et al. | |
|---|---|---|---|---|
| 7,729,333 | B2 | 6/2010 | Wang et al. | |
| 8,055,192 | B2* | 11/2011 | Park et al. | 455/39 |
| 8,208,458 | B2* | 6/2012 | Tang et al. | 370/342 |
| 2004/0153574 | A1* | 8/2004 | Cohen et al. | 709/245 |
| 2005/0105589 | A1* | 5/2005 | Sung et al. | 375/130 |
| 2005/0286663 | A1 | 12/2005 | Poon | |
| 2007/0058590 | A1* | 3/2007 | Wang et al. | 370/334 |
| 2007/0066332 | A1 | 3/2007 | Zhang et al. | |
| 2007/0160162 | A1 | 7/2007 | Kim et al. | |

(Continued)

FOREIGN PATENT DOCUMENTS
CN 1885735 A 12/2006
(Continued)

OTHER PUBLICATIONS

Written Opinion of the International Searching Authority (Corrected Version), Date of mailing: Jul. 16, 2009, 3 pages, PCT/CN2009/071185.

(Continued)

*Primary Examiner* — Christopher Wyllie
(74) *Attorney, Agent, or Firm* — Slater & Matsil, L.L.P.

(57) ABSTRACT

A system and method for multi-stage zero forcing beamforming in a wireless communications system is provided. A method includes receiving feedback information from each mobile station (MS) in a first plurality of mobile stations (MSs), selecting a first MS from the first plurality of MSs, and broadcasting information related to the first MS to the first plurality of MSs. The first MS having a largest value of a first metric based on the feedback information received from the first plurality of MSs. The method also includes receiving feedback information from each MS in a second plurality of MSs, selecting a second MS from the second plurality of MSs, and creating a precoding matrix from feedback information from the first MS and the second MS. The second MS having a largest value of a second metric based on the feedback information received from the second plurality of MSs.

11 Claims, 6 Drawing Sheets

U.S. PATENT DOCUMENTS

| | | | |
|---|---|---|---|
| 2008/0165875 A1* | 7/2008 | Mundarath et al. | 375/262 |
| 2008/0225960 A1* | 9/2008 | Kotecha et al. | 375/259 |
| 2008/0227495 A1* | 9/2008 | Kotecha et al. | 455/562.1 |
| 2008/0292012 A1* | 11/2008 | Kim et al. | 375/260 |
| 2008/0316935 A1* | 12/2008 | Bala et al. | 370/252 |
| 2009/0004986 A1* | 1/2009 | Park et al. | 455/226.3 |
| 2009/0247175 A1* | 10/2009 | van Rensburg et al. | 455/450 |
| 2009/0252091 A1* | 10/2009 | Tang et al. | 370/328 |
| 2009/0252251 A1* | 10/2009 | Tosato et al. | 375/267 |
| 2010/0054212 A1* | 3/2010 | Tang | 370/335 |
| 2010/0142599 A1* | 6/2010 | Tang et al. | 375/219 |
| 2010/0151871 A1* | 6/2010 | Zhang et al. | 455/450 |
| 2010/0177742 A1* | 7/2010 | Tang et al. | 370/335 |
| 2010/0265841 A1* | 10/2010 | Rong et al. | 370/252 |
| 2011/0103493 A1* | 5/2011 | Xia et al. | 375/259 |
| 2012/0039416 A1* | 2/2012 | Tang et al. | 375/296 |
| 2012/0076032 A1* | 3/2012 | Mundarath et al. | 370/252 |
| 2012/0114064 A1* | 5/2012 | Kotecha et al. | 375/295 |
| 2012/0201165 A1* | 8/2012 | Ko et al. | 370/252 |

FOREIGN PATENT DOCUMENTS

| | | |
|---|---|---|
| CN | 1973473 A | 5/2007 |
| CN | 101036316 A | 9/2007 |
| EP | 1 737 141 A2 | 12/2006 |

OTHER PUBLICATIONS

Extended European Search Report, Dec. 29, 2010, 6 pages, Application No./Patent No. 09726631.6-2412/2189028 PCT/CN2009/071185.

* cited by examiner

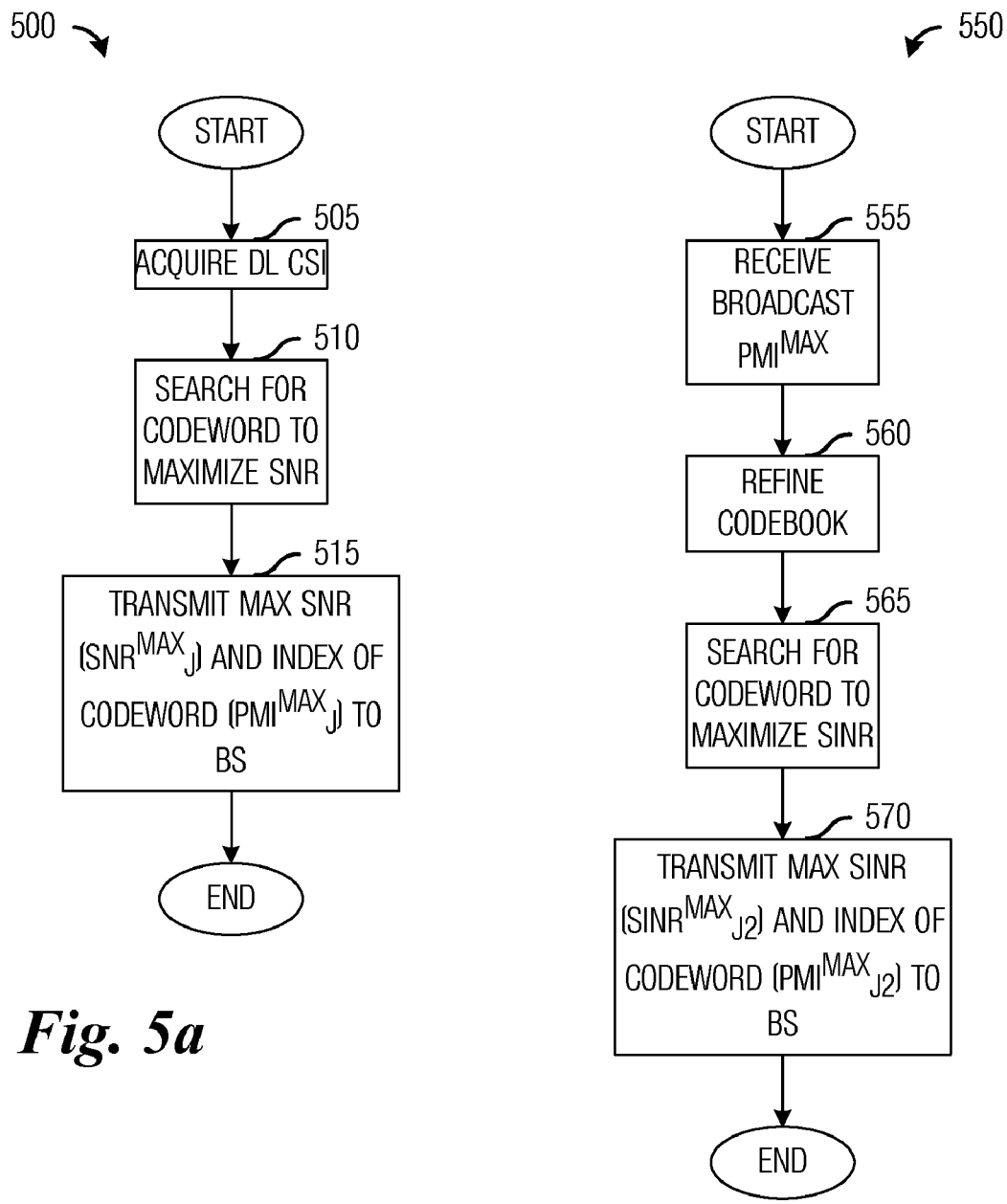

SYSTEM AND METHOD FOR MULTI-STAGE ZERO FORCING BEAMFORMING IN A WIRELESS COMMUNICATIONS SYSTEM

This application claims the benefit of U.S. Provisional Application No. 61/042,675, filed on Apr. 4, 2008, entitled "Multiple Stages Zero Forcing Beamforming," which application is hereby incorporated herein by reference.

TECHNICAL FIELD

The present invention relates generally to wireless communications, and more particularly to a system and method for multi-stage zero forcing beamforming in a wireless communications system.

BACKGROUND

In general, zero forcing beamforming (ZFBF) is a linear precoding scheme that decouples a multiuser channel into multiple independent sub-channels and reduces a precoder design into a power allocation problem. Typically, ZFBF performs well in high signal-to-noise ratio (SNR) environments. Furthermore, it is possible to incorporate additional techniques into ZFBF, such as dirty paper coding (DPC), to help improve performance.

Closed loop multi-user multiple input and multiple output (MU-MIMO) technologies recently have attracted significant attention from both standardization bodies and telecommunication industries around the world. By jointly taking advantage of multiuser diversity and inherent space-time diversity of MIMO system, MU-MIMO can significantly improve system throughput and achieve higher bandwidth efficiency compared to conventional single user MIMO.

ZFBF is a promising candidate of close loop MU-MIMO technologies for next generation wireless communication systems. However, inherent quantization error accumulation and poor signal and interference to noise ratio (SINR) estimation may prevent ZFBF from commercialization.

SUMMARY OF THE INVENTION

These and other problems are generally solved or circumvented, and technical advantages are generally achieved, by embodiments of a system and method for multi-stage zero forcing beamforming.

In accordance with an embodiment, a method for performing zero forcing beamforming at a base station (BS) of a wireless communications system is provided. The method includes receiving feedback information from each mobile station (MS) in a first plurality of mobile stations (MSs), selecting a first MS from the first plurality of MSs, and broadcasting information related to the first MS to the first plurality of MSs. The first MS having a largest value of a first metric based on the feedback information received from the first plurality of MSs. The method also includes receiving feedback information from each MS in a second plurality of MSs, selecting a second MS from the second plurality of MSs, and creating a precoding matrix from feedback information from the first MS and the second MS. The second plurality of MSs is a subset of the first plurality of MSs, and the second MS having a largest value of a second metric based on the feedback information received from the second plurality of MSs.

In accordance with another embodiment, a method for performing zero forcing beamforming at a mobile station (MS) of a wireless communications system is provided. The wireless communications system having a base station (BS). The method includes measuring a channel state information (CSI) of a communications channel between the BS and the MS, selecting a first codeword from a codebook representing a quantized version of the CSI, and transmitting an index of the first codeword and channel quality information (CQI) corresponding to the first codeword to the BS. The method also includes receiving an indication of a selected MS from the BS, refining the codebook based on the indication, selecting a second codeword representing a quantized version of the CSI from the refined codebook, and transmitting an index of the second codeword and channel quality information (CQI) corresponding to the second codeword to the BS.

In accordance with another embodiment, a method for performing zero forcing beamforming at a base station (BS) of a wireless communications system is provided. The BS is capable of actively supporting X mobile stations (MSs). The method includes selecting a first mobile station (MS) based on feedback information from a first plurality of MSs, broadcasting information related to the first MS to the first plurality of MSs, selecting a second MS based on feedback information from a second plurality of MSs, and broadcasting information related to the second MS to the second plurality of MSs. The method also includes selecting a third MS based on feedback information from a third plurality of MSs, and creating a precoding matrix from feedback information from the first MS, the second MS, and the third MS.

In accordance with another embodiment, a method for performing zero forcing beamforming at a mobile station (MS) of a wireless communications system is provided. The wireless communications system having a base station (BS) that is capable of actively supporting X mobile stations (MSs). The method includes measuring a channel state information (CSI) of a communications channel between the BS and the MS, computing a first feedback information based on the CSI, and transmitting the first feedback information to the BS. The method also includes receiving a first indication of a first selected MS from the BS, computing a second feedback information based on the first indication, and transmitting the second feedback information to the BS. The method further includes receiving a second indication of a second selected MS from the BS, computing a third feedback information based on the second indication, and transmitting the second feedback information to the BS.

In accordance with another embodiment, a method for wirelessly communicating in a wireless communications system is provided. The method includes performing a multi-stage zero forcing beamforming (MS ZFBF) to select a set of mobile stations (MSs) from a plurality of MSs in the wireless communications system, computing a precoding matrix based on results of the MS ZFBF, and transmitting to mobile stations in the set of MSs. The transmissions to each MS in the set of MSs uses an entry in the precoding matrix corresponding to the MS.

An advantage of an embodiment is that mobile stations compute their respective precoding vectors. This helps to diminish the accumulation of quantization error inherent in typical ZFBF and helps to improve performance.

A further advantage of an embodiment is that a predefined codebook may be updated based on broadcast information provided by a base station. The updated codebook helps to make codewords in the codebook orthogonal to beamforming vectors. This helps to effectively increase codebook quantization resolution without enlarging codebook size.

Yet another advantage of an embodiment is that beamforming vectors provided by a base station help to make estimates of channel quality indicator by mobile stations more accurate.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 5a and 5b are flow diagrams of mobile station operations during a first stage and a second stage of a multi-stage zero forcing beamforming;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an orthogonal frequency division multiple access (OFDMA) wireless communications making use of multi-user multiple input, multiple output (MU-MIMO). The invention may be applied to a wide variety of wireless communications systems using a wide variety of transmission mechanisms, such as time division duplex (TDD), frequency division duplex (FDD), or code division duplex (CDD).

Figure 1:
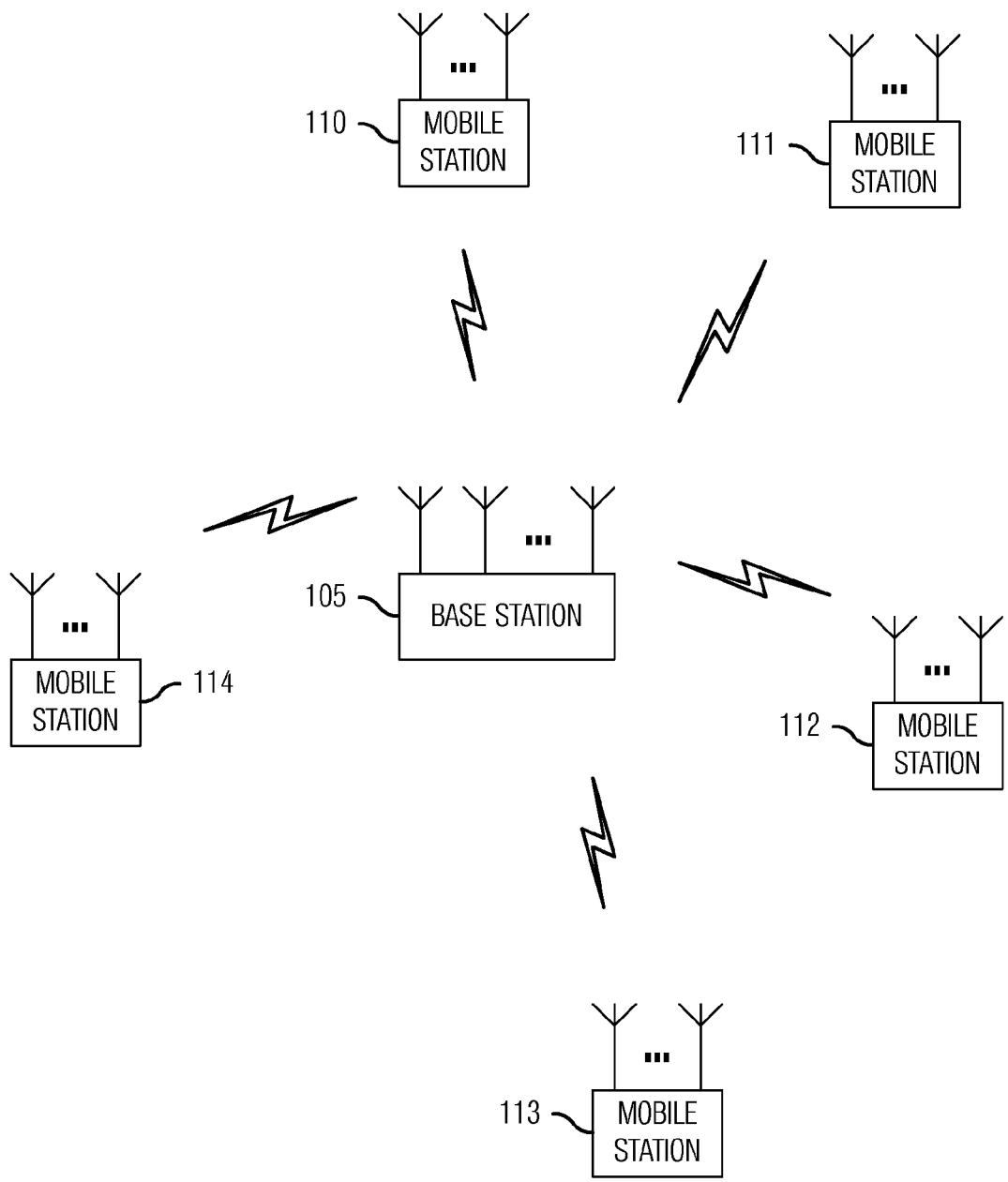
FIG. 1 is a diagram of a wireless communications system.

FIG. 1 illustrates a wireless communications system 100. Wireless communications system 100 includes a base station (BS) 105. BS 105 may be responsible for serving mobile stations (MSs) operating within its coverage area, including but not limited to MSs 110 through 114. In general, BS 105 may transmit information for a MS over a downlink (DL) and allocate resources to a MS on an uplink (UL) based on a resource request for the MS. In order to more efficiently utilize available bandwidth, BS 105 and MSs 110 through 114 may use MU-MIMO, which may allow simultaneous transmissions to multiple MSs or simultaneous transmissions from one or more MSs. Generally, the number of simultaneous transmissions may be dependent on factors such as communications system configuration, number of transmit antennas, number of receive antennas, and so forth.

As discussed above, ZFBF may have several problems that impact its performance in a MU-MIMO environment: quantization error accumulation and poor signal and interference to noise ratio (SINR) estimation. A multi-stage ZFBF, as described below, may help to reduce quantization error accumulation and poor SINR estimation by performing precoder design at MSs rather than in the BS. Quantization error accumulation may be reduced since the MSs have an exact representation of a channel between the BS and the MS. If the precoder design is performed at the BS as in ZFBF, a quantized version of the channel (provided by the MS to the BS) would be used since quantization is required to help reduce feedback bandwidth. The use of the quantized version of the channel may lead to quantization error accumulation. Similarly, SINR estimation performed at the MS yields better results than SINR estimation performed at the BS.

Figure 2:
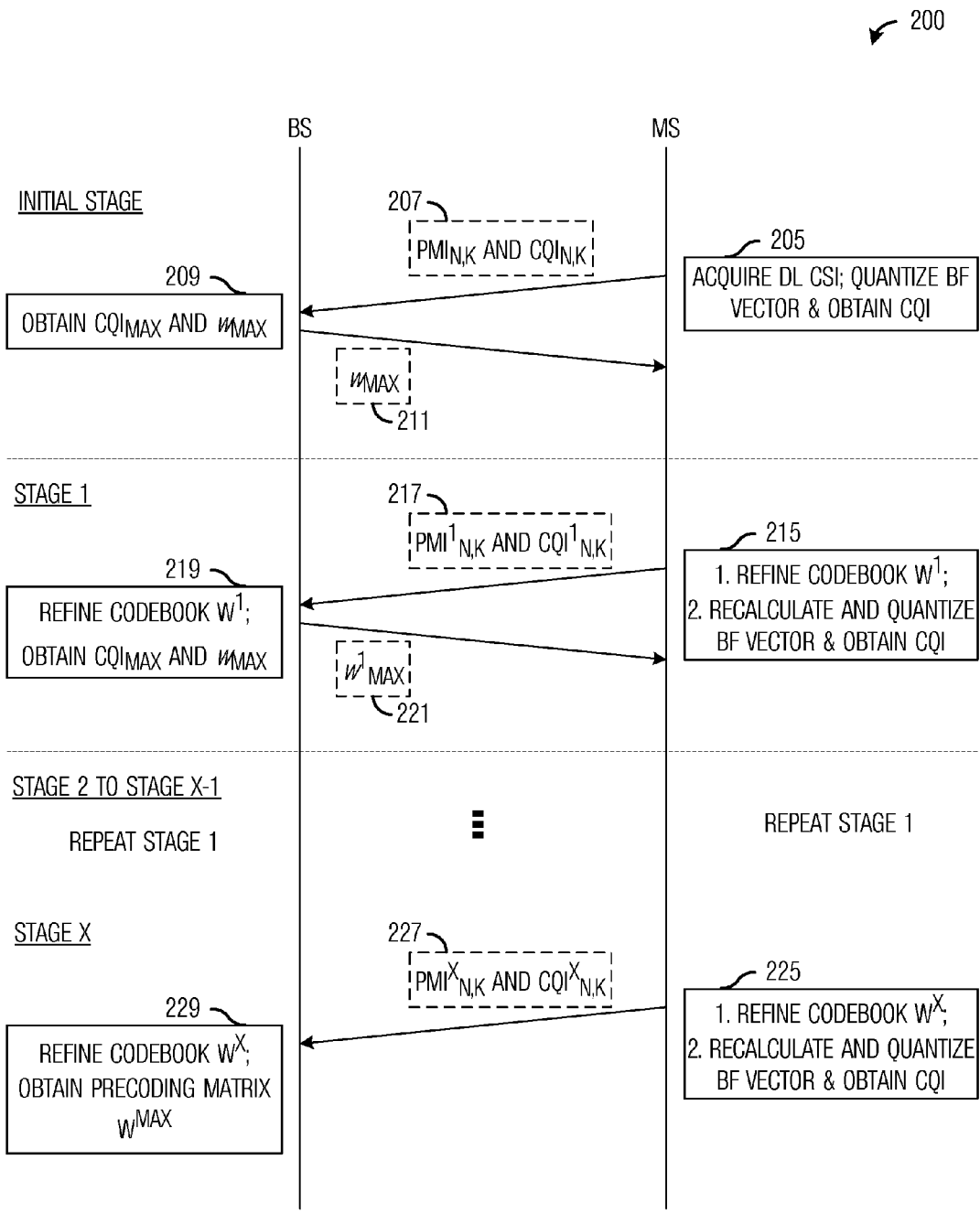
FIG. 2 is a transmission flow diagram of transmissions occurring during a multi-stage zero forcing beamforming for computing a precoding matrix.

FIG. 2 illustrates a transmission flow diagram of transmissions occurring during a multi-stage ZFBF 200 for computing a precoding matrix in a wireless communications system. In general, a multi-stage ZFBF occurs periodically in a wireless communications system. A frequency that a multi-stage ZFBF occurs may be dependent on factors such as expected mobility of MSs, desired accuracy of a precoding matrix, amount of overhead to be dedicated to determining a precoding matrix, and so forth. For example, if MSs in a wireless communications system have high mobility, then a frequency of multi-stage ZFBF should be high to help keep a precoding matrix accurate as the MSs move around, while if MSs have very slow mobility, then a frequency may be low without significant performance penalty.

Alternatively, rather than specifying a frequency for performing a multi-stage ZFBF to compute a precoding matrix, an occurrence of an event may be used to trigger a performing of a multi-stage ZFBF. For example, a specified event may be when a metric exceeds a threshold. Examples of metrics may include error rates (such as bit-error rate, frame-error rate, packet-error rate, and so forth), measurable values (such as SINR, signal to noise ratio (SNR), and so on), etc. The specified event may occur at either the BS or the MSs or both.

For discussion purposes, let a BS, such as BS 105, have $N_{BS}$ transmit antennas and serves up to K active MSs (such as MSs 110 through 114), and a k-th MS ($MS_k$) may have $N_{MS}^k$ receive antennas. Furthermore, a MIMO channel between BS and $MS_k$ is denoted $H_k$, where $H_k H_k^H = U_k \Sigma_k U_k^H$, in which $U_k = [u_{k1}, \ldots, u_{k1_{BS}}]$ is a $N_{BS} \times N_{BS}$ unitary matrix and $\Sigma$ is a diagonal matrix with $H_k H_k^H$'s eigenvalues along its right diagonal in a non-increasing order. Also, a predefined codebook $W = \{w_1, w_2, \ldots, w_M\}$ is known for both BS 105 and all BSs. Codebook W consists of M codewords, with the i-th codeword being represented by $w_i$.

Multi-stage ZFBF 200 comprises multiple stages, with a number of stages being a function of a number of active MSs that the BS can support. In general, for X active MSs that the BS can support, multi-stage ZFBF 200 includes X+1 stages. A first stage of multi-stage ZFBF 200 may be referred to as an initial stage.

The initial stage may involve user selection and may begin at MSs desiring to communicate. At these MSs, channel state information (CSI) for a DL may be acquired by the MSs (block 205). The discussion of MS operation describes the operations taking place at a single MS. However, the operations actually take place at a number of MSs. The operations at the different MSs may be occurring substantially concurrently to one another. Therefore, the description of MS operation should not be construed as being limiting to either the scope or spirit of the embodiments. A MS (for example, $MS_k$) may acquire the CSI for the DL by measuring a pilot transmitted by the BS, for example. Alternatively, $MS_k$ may measure transmissions made on the DL by the BS over time to acquire the CSI.

In addition to acquiring the CSI, $MS_k$ may quantize one or more of the column vectors of $U_k$ with the predefined codebook W (block 205). The quantized beamforming vectors of specified channels may be represented by codewords of the codebook W. A variety of codeword selection metrics may be used and may be selected based on factors such as desired accuracy, available processing capability of $MS_k$, and so on. Examples of a codeword selection metric include SNR, SINR, and so forth. In addition to the quantized beamforming vectors, channel quality information (CQI) associated with the selected codewords may be obtained (block 205). $MS_k$ may then transmit indices of the selected codewords ($PMI_{n,k}$) and associated CQI ($CQI_{n,k}$) back to the BS (transmission 207).

At the BS, the BS may receive the indices of the selected codewords ($PMI_{n,k}$) and associated CQI ($CQI_{n,k}$) from each of the MSs desiring to communicate (over transmission 207, for example). In general, the BS will receive $PMI_{n,k}$ and $CQI_{n,k}$ from $N_k$ MSs. Let the n-th PMI and CQI from $MS_k$ be denoted $PMI_{n,k}$ and $CQI_{n,k}$, where $n \in \{0,1, \ldots N_k\}$ and $k \in \{0,1, \ldots, K\}$. The BS may then select the MS with the largest $$CQI, CQI_{max} = \max_{\substack{k \in \{0, \ldots, K\} \\ n \in \{0, \ldots, N_k\}}} (CQI_{n,k})$$

(block 209) and broadcasts the corresponding codeword, denoted $w_{max}$, or its PMI, denoted by $PMI_{max}$, to all MSs (transmission 211).

Stage 1 may then begin. At $MS_k$, codebook W may be refined based on broadcast $w_{max}$ or $PMI_{max}$ (block 215). The refined codebook is expressible as $W^1 = \{w_1^1, w_2^1, \ldots, w_M^1\}$, in which codeword $W_i^1$ is defined as $w_i^1 = w_i - w_i w_{max}^H w_{max}$. Based on codeword $w_{max}$ and $U_k$, $MS_k$ also recalculates the beamforming vectors (block 215), given as $u_{ki}^1 = u_{ki} - u_{ki} w_{max}^H w_{max}$, where $u_{ki}^1$ represents the refined i-th beamforming vector of $MS_k$ at stage 1. Refined vector $u_{ki}^1$ may then be quantized and represented by one of the codewords in codebook $W^1$. Additionally, CQI associated with the selected codeword is also obtained (block 215). Finally, the PMI of selected codewords in $W^1$ ($PMI_{n,k}^1$) and associated CQI ($CQI_{n,k}^1$) are fedback from $MS_k$ to BS (transmission 217).

At the BS, the BS receives $N_k^1$ PMI and CQI from $MS_k$. Let $PMI_{n,k}^1$ and $CQI_{n,k}^1$ denote the PMI and CQI of the n-th PMI and CQI of MS k at stage 1, where $n \in \{0,1, \ldots N_k^1\}$ and $k \in \{0,1, \ldots, K\}$. The BS also refines its codebook based on the received transmissions (block 219). The BS selects the MS with the largest CQI among all stage 1 feedback, denoted by $$CQI_{max}^1 = \max_{\substack{k \in \{0, \ldots, K\} \\ n \in \{0, \ldots, N_k^1\}}} (CQI_{n,k}^1)$$

(block 219), and broadcasts the corresponding PMI, denoted by $PMI_{max}^1$, (or its corresponding codeword) to all MSs (transmission 221). The codeword corresponding to $PMI_{max}^1$ at stage 1 is denoted by $w_{max}^1$.

In general, once a MS has been selected by the BS, it is no longer considered for selection of the MS with the largest CQI. Alternatively, once a MS has been selected by the BS, it no longer participates in multi-stage ZFBF 200. Hence, the number of MSs being considered by the BS at a stage is less than the number of MSs being considered by the BS at a previous stage.

Stages 2 through X-1 are substantially iterations of stage 1. At $MS_k$, the $MS_k$ may continue to refine its codebook based on the $PMI_{max}^{L-1}$ or $w_{max}^{L-1}$ broadcast by the BS, where L is the stage number; recalculate and quantize a beamforming vector based on the refined codebook; and then transmit back to the BS, $PMI_{n,k}^{L-1}$ and $CQI_{n,k}^{L-1}$. While at the BS, the BS receives $PMI_{n,k}^{L-1}$ and $CQI_{n,k}^{L-1}$ from the MSs and refines its codebook. Furthermore, the BS selects the MS with the largest CQI among all stage L-1 feedback, denoted $$CQI_{max}^{L-1} = \max_{\substack{k \in \{0, \ldots, K\} \\ n \in \{0, \ldots, N_k^{L-1}\}}} (CQI_{n,k}^{L-1}),$$

and broadcast the corresponding PMI, denoted $PMI_{n,k}^{L-1}$, (or its corresponding codeword) to all MSs. The codeword corresponding to $PMI_{n,k}^{L-1}$ at stage L-1 is denoted by $w_{max}^{L-1}$.

Stage X. At $MS_k$, the $MS_k$ may receive broadcasted $PMI_{max}^{X-1}$ from stage X-1 or corresponding codeword $w_{max}^{X-1}$. The $MS_k$ refine its codebook $W^{X-1}$ based on the received broadcast (block 225). The refined codebook is denote by $W^X = \{w_1^X, w_2^X, \ldots, w_M^X\}$, in which codeword $w_i^X$ is defined as $w_i^X = w_i^X - w_i^X (w_{max}^{X-1})^H w_{max}^{X-1}$. The $MS_k$ may also recalculate beamforming vectors, given as $u_{ki}^X = u_{ki}^{X-1} - u_{ki}^{X-1} (w_{max}^{X-1})^H w_{max}^{X-1}$, where $u_{ki}^{X-1}$ represents the refined i-th beamforming vector of MS k at stage X-1 and $u_{ki}^X$ represents the refined i-th beamforming vector of MS k at stage X. $u_{ki}^X$ can be quantized and represented by a codeword in codebook $W^X$ (block 225). Furthermore, CQI associated with selected codeword is also obtained. The PMI of the selected codewords ($PMI_{n,k}^X$) and associated CQI ($CQI_{n,k}^X$) are fedback to the BS (transmission 227).

At the BS, the BS receives $N_k^X$ PMI and CQI from $MS_k$. Let $PMI_{n,k}^X$ and $CQI_{n,k}^X$ denote the PMI and CQI of the n-th PMI and CQI of $MS_k$ at stage X, where $n \in \{0,1, \ldots N_k^X\}$ and $k \in \{0,1, \ldots, K\}$. The BS may then refine its codebook with the received information. The BS selects the MS with the largest CQI among all Stage X feedback, denoted by $$CQI_{max}^X = \max_{\substack{k \in \{0, \ldots, K\} \\ n \in \{0, \ldots, N_k^X\}}} (CQI_{n,k}^X).$$

The codeword corresponding to $PMI_{max}^X$ at stage X is denoted by $w_{max}^X$. The ZFBF precoding matrix may then be obtained at the BS and may be expressed as $W^{max} = [w_{max}, w_{max}^1, \ldots, W_{max}^X]$. The ZFBF precoding matrix comprises the $w_{max}$ terms associated with MSs selected by the BS at each stage of multi-stage ZFBF 200.

Although the above discussion focuses on a multi-stage ZFBF wherein the number of stages in the multi-stage ZFBF is on the order of the number of MSs that the BS can actively support. However, since the multi-stage ZFBF may need to be repeated performed in rapid succession, having to iterate over so many stages may result in significant overhead that negatively impacts performance. Therefore, an alternate embodiment of the multi-stage ZFBF may have a fixed number of stages that is independent of the number of MSs that the BS can actively support. In such an embodiment, the multi-stage ZFBF may be used to allow for the fixed number of terms (i.e., vectors) in the precoding matrix to be computed at the MSs (the MSs having the largest CQI values) without incurring quantization error accumulation and using full unquantized CSI, while, the BS may compute the remainder of the terms in the precoding matrix using quantized CSI provided by the MSs.

Figure 3A:
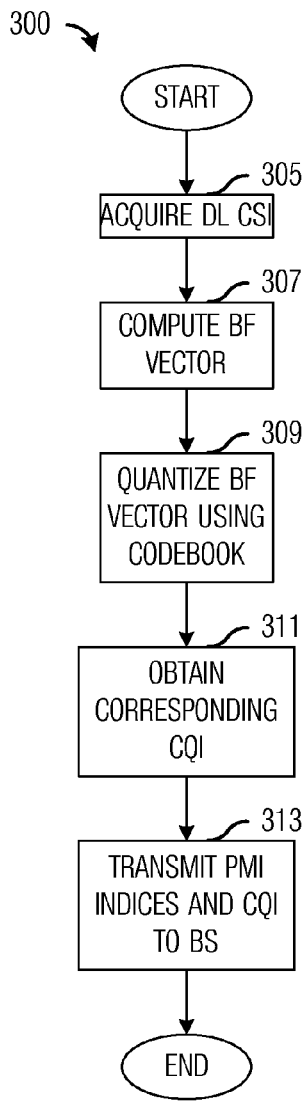
FIGS. 3a through 3c are flow diagrams of mobile station operations during an initial stage, an intermediate stage, and a final stage of a multi-stage zero forcing beamforming.

FIG. 3a illustrates a flow diagram of MS operations 300 in an initial stage of a multi-stage ZFBF to compute a precoding matrix. MS operations 300 may be descriptive of operations taking place in a MS, such as $MS_k$, of a number of MS desiring to communicate. MS operations 300 may occur each time a multi-stage ZFBF is performed to compute a precoding matrix.

MS operations 300 may begin with the MS acquiring CSI of a DL between a BS and the MS (block 305). The MS may acquire the CSI of the DL by measuring a pilot (or pilots) transmitted by the BS. Alternatively, the MS may acquire the CSI of the DL by measuring transmissions made by the BS over time. After acquiring the CSI of the DL, the MS may compute (block 307) and then quantize (block 309) a beamforming vector(s). The beamforming vectors may be quantized by selecting codewords from a codebook W, which is known at both the MS and the BS. In addition to selecting the codewords, the MS may obtain CQI associated with the selected codewords (block 311). The MS may then transmit indices of the codewords (PMI) and the CQI back to the BS (block 313). MS operations 300 may then terminate.

Figure 3B:
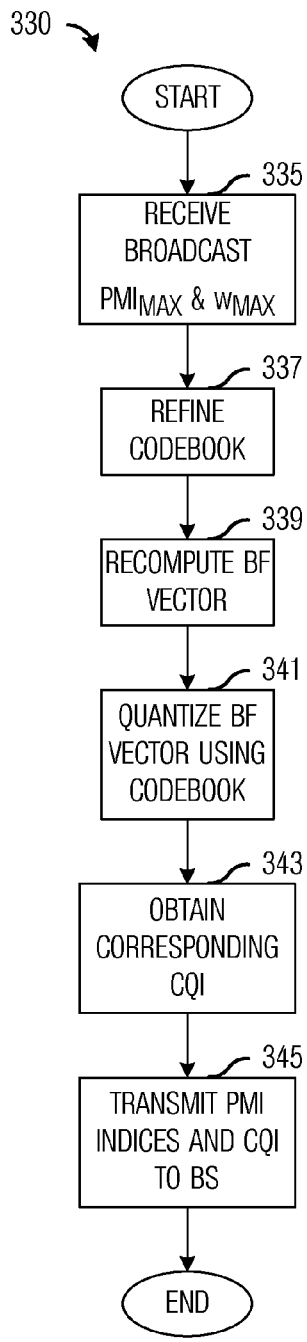

FIG. 3b illustrates a flow diagram of MS operations 330 in an intermediate stage of a multi-stage ZFBF to compute a precoding matrix. MS operations 330 may be descriptive of operations taking place in a MS, such as $MS_k$, of a number of MS desiring to communicate. MS operations 330 may occur each time a multi-stage ZFBF is performed to compute a precoding matrix. The number of times that MS operations 330 occurs may be dependent on the number of MSs that the BS may actively support. For example, with X MSs, MS operations 330 may occur a total of X−1 times.

MS operations 330 may begin with the MS receiving either $w_{max}$ or $PMI_{max}$ that was broadcast by the BS at the end of a prior stage of the multi-stage ZFBF (block 335). Typically, the BS will broadcast $PMI_{max}$ since it may require less information to transmit. For example, if L represents the stage number, then the MS may receive $PMI_{max}^{L-1}$ or $w_{max}^{L-1}$ from the BS. The MS may then use $w_{max}$ or $PMI_{max}$ to refine its codebook W. The MS may produce codebook $W^L$ from codebook $W^{L-1}$, for example, if L=1, the refined codebook is expressible as $W^1=\{w_1^1, w_2^1, \ldots, w_M^1\}$, codeword $w_i^1$ is defined as $w_i^1=w_i-w_i w_{max}^H w_{max}$. Based on codeword $w_{max}$ and $U_k$, the MS also recomputes the beamforming vectors (block 339), given as $u_{ki}^L=u_{ki}-u_{ki}w_{max}^H w_{max}$, where $u_{ki}^L$ represents the refined i-th beamforming vector of $MS_k$ at stage L. Refined vector $u_{ki}^L$ may then be quantized and represented by one of codewords in codebook $W^L$ (block 341). Additionally, CQI associated with the selected codeword is also obtained (block 343). Finally, the PMI of selected codewords in $W^L$ ($PMI_{n,k}^L$) and associated CQI ($CQI_{n,k}^L$) are fedback from MS to BS (block 345). MS operations 330 may then terminate.

Optionally, MS operations 330 may include the MS acquiring the CSI of a DL between the BS and the MS. If the MS does not acquire the CSI of the DL between the BS and the MS, then the MS may use the CSI acquired during MS operations 300, for example.

Figure 3C:
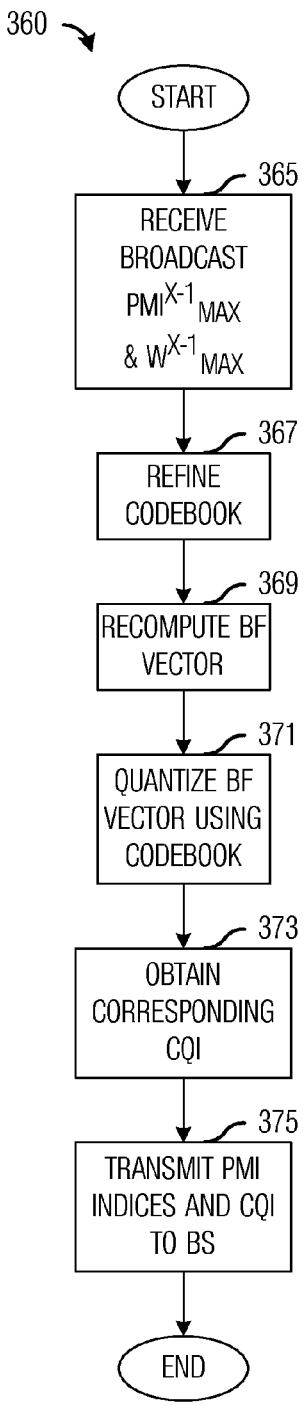

FIG. 3c illustrates a flow diagram of MS operations 360 in a final stage of a multi-stage ZFBF to compute a precoding matrix. MS operations 360 may be descriptive of operations taking place in a MS, such as $MS_k$, of a number of MS desiring to communicate. MS operations 360 may occur each time a multi-stage ZFBF is performed to compute a precoding matrix.

MS operations 360 may begin with the MS receiving either $w_{max}^{X-1}$ or $PMI_{max}^{X-1}$ that was broadcast by the BS at the end of a prior stage of the multi-stage ZFBF, where X is the number of MSs that the BS can actively support (block 365). Typically, the BS will broadcast $PMI_{max}$ since it may require less information to transmit. The MS may then use $w_{max}^{X-1}$ or $PMI_{max}^{X-1}$ to refine its codebook W (block 367). The MS may produce codebook $W^X$ from codebook $W^{X-1}$, where the refined codebook is expressible as $W^X=\{w_1^X, w_2^X, \ldots, w_M^X\}$, in which codeword $w_i^X$ is defined as $w_i^X=w_i^X-w_i^X(w_{max}^{X-1})^H w_{max}^{X-1}$. The MS may also recalculate beamforming vectors, given as $u_{ki}^X=u_{ki}^{X-1}-u_{ki}^{X-1}(w_{max}^{X-1})^H w_{max}^{X-1}$, where $u_{ki}^{X-1}$ represents the refined i-th beamforming vector of MS k at stage X-1 and $u_{ki}^{X-1}$ represents the refined i-th beamforming vector of MS k at stage X (block 369). $u_{ki}^X$ can be quantized and represented by a codeword in codebook $W^X$ (block 371). Furthermore, CQI associated with selected codeword is also obtained (block 373). The PMI of the selected codewords ($PMI_{n,k}^X$) and associated CQI ($CQI_{n,k}^X$) are fedback to the BS (block 375). MS operations 360 may then terminate.

Optionally, MS operations 360 may include the MS acquiring the CSI of a DL between the BS and the MS. If the MS does not acquire the CSI of the DL between the BS and the MS, then the MS may use the CSI acquired during MS operations 300 or MS operations 330, for example.

Figure 4A:
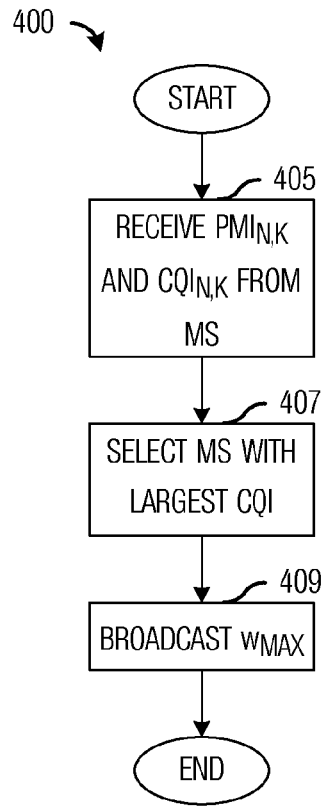
FIGS. 4a through 4c are flow diagrams of base station operations during an initial stage, an intermediate stage, and a final stage of a multi-stage zero forcing beamforming.

FIG. 4a illustrates a flow diagram of BS operations 400 in an initial stage of a multi-stage ZFBF to compute a precoding matrix. BS operations 400 may be descriptive of operations taking place in a BS. BS operations 400 may occur each time a multi-stage ZFBF is performed to compute a precoding matrix.

BS operations 400 may begin with the BS receiving the indices of the selected codewords ($PMI_{n,k}$) and associated CQI ($CQI_{n,k}$) from each of the MSs desiring to communicate (block 405). In general, the BS will receive $PMI_{n,k}$ and $CQI_{n,k}$ from $N_k$ MSs. Let the n-th PMI and CQI from $MS_k$ be denoted $PMI_{n,k}$ and $CQI_{n,k}$, where $n \in \{0,1,\ldots N_k\}$ and $k \in \{0,1,\ldots,K\}$. The BS may then select the MS with the largest CQI, $$CQI_{max} = \max_{\substack{k \in \{0,\ldots,K\} \\ n \in \{0,\ldots,N_k\}}} (CQI_{n,k})$$

(block 407) and broadcasts the corresponding codeword, denoted $w_{max}$, or its PMI, denoted by $PMI_{max}$, to all MSs (block 409). BS operations 400 may then terminate.

Figure 4B:
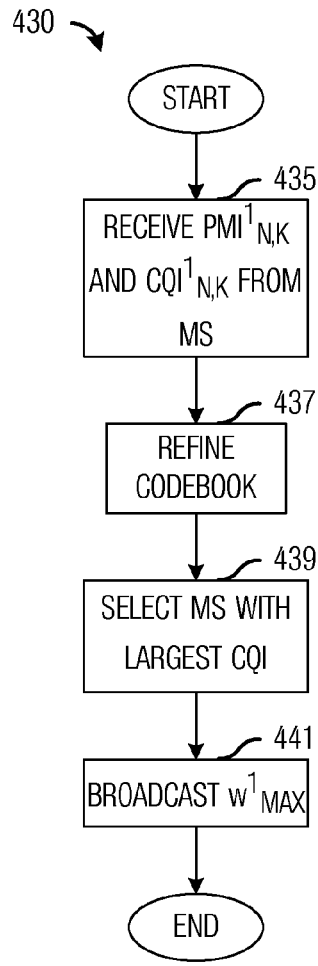

FIG. 4b illustrates a flow diagram of BS operations 430 in an intermediate stage of a multi-stage ZFBF to compute a precoding matrix. BS operations 430 may be descriptive of operations taking place in a BS. BS operations 430 may occur each time a multi-stage ZFBF is performed to compute a precoding matrix. The number of times that BS operations 430 occurs may be dependent on the number of MSs that the BS may actively support. For example, with X MSs, BS operations 430 may occur a total of X−1 times.

BS operations 430 may begin with the BS receiving $N_k^L$ PMI and CQI from $MS_k$ (block 435). Let $PMI_{n,k}^L$ and $CQI_{n,k}^L$ denote the PMI and CQI of the n-th PMI and CQI of MS k at stage L, where $n \in \{0,1,\ldots N_k^L\}$ and $k \in \{0,1,\ldots,K\}$. The BS also refines its codebook based on the received transmissions (block 437). The BS selects the MS with the largest CQI among all stage L feedback, denoted by $$CQI_{max}^L = \max_{\substack{k \in \{0, \ldots, K\} \\ n \in \{0, \ldots, N_k^L\}}} (CQI_{n,k}^L)$$

(block 439), and broadcasts the corresponding PMI, denoted by $PMI_{max}^L$, (or its corresponding codeword) to all MSs (block 441). The codeword corresponding to $PMI_{max}^1$ at stage 1 is denoted by $w_{max}^1$. BS operations 430 may then terminate.

Figure 4C:
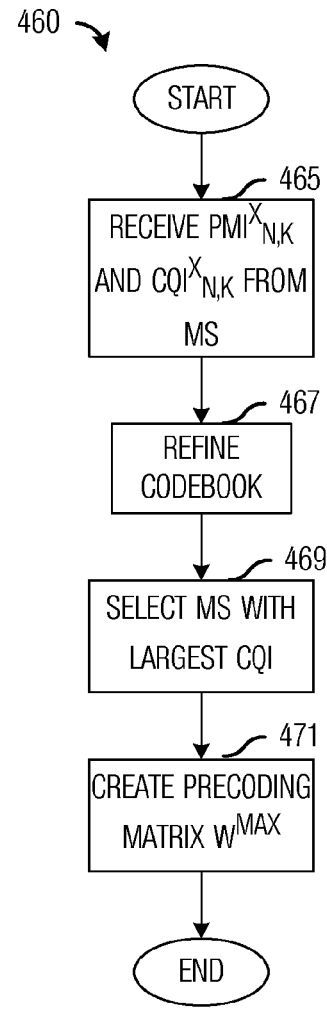

FIG. 4c illustrates a flow diagram of BS operations 460 in a final stage of a multi-stage ZFBF to compute a precoding matrix. BS operations 460 may be descriptive of operations taking place in a BS. BS operations 460 may occur each time a multi-stage ZFBF is performed to compute a precoding matrix.

BS operations 460 may begin with the BS receiving $N_k^X$ PMI and CQI from $MS_k$ (block 465). Let $PMI_{n,k}^X$ and $CQI_{n,k}^X$ denote the PMI and CQI of the n-th PMI and CQI of $MS_k$ at stage X, where $n \in \{0,1, \ldots N_k^X\}$ and $k \in \{0,1, \ldots, K\}$. The BS may then refine its codebook using the received information (block 467). The BS selects the MS with the largest CQI among all Stage X feedback, denoted by $$CQI_{max}^X = \max_{\substack{k \in \{0, \ldots, K\} \\ n \in \{0, \ldots, N_k^X\}}} (CQI_{n,k}^X),$$

(block 469). The codeword corresponding to $PMI_{max}^X$ at stage X is denoted by $w_{max}^X$. The ZFBF precoding matrix may then be obtained at the BS and may be expressed as $W^{max} = [w_{max}, w_{max}^1, \ldots, w_{max}^X]$ (block 471). The ZFBF precoding matrix comprises the $w_{max}$ terms associated with MSs selected by the BS at each stage of multi-stage ZFBF 200. BS operations 460 may then terminate.

FIG. 5a illustrates a flow diagram of MS operations 500 in a stage one (1) of a two-stage ZFBF to compute a precoding matrix for use in a wireless communications system, wherein a BS may support up to two active MSs. MS operations 500 may be an exemplary implementation of the initial stage of a multi-stage ZFBF discussed previously.

MS operation 500 may begin with the MS acquiring CSI of a DL between the BS and the MS at an X-th frame (block 505). After acquiring the CSI of the MS may search for a codeword in a codebook W that will maximize the SNR (block 510).

The maximized SNR of the MS may be obtained as $$SNR_j^{max} = \max\left(\frac{|(w_1^i)' h_j(X)|^2}{N(X)}, i \in [1, \ldots, K_1]\right),$$

where $w_1^i$ is the i-th codeword in the codebook, N(X) is a background noise plus inter-cell interference at X-th frame and $h_j(X)$ is a beamforming vector of MS j at the X-th frame.

The MS may transmit the maximum SNR ($SNR_j^{max}$) and a codeword index corresponding to the maximum SNR ($PMI_j^{max}$) back to the BS (block 515). According to an alternate embodiment, instead of finding the codeword that maximizes the SNR, the MS may select a codeword that first results in the SNR exceeding a threshold. By reporting the first codeword that results in the SNR exceeding a threshold, the MS may more rapidly report the SNR and the codeword index back to the BS, which may help to improve two-stage ZFBF performance.

The amount of feedback information transmitted back to the BS may be dependent on the configuration of the wireless communications system. For example, in a WiMAX wireless communications system using the partial usage of sub-carriers (PUSC) permutation, only one PMI is fedback. However, if the system is using the adaptive modulation and coding (AMC) permutation with multiple sub-bands, then PMI is fedback for each sub-band. MS operations 500 may then terminate.

FIG. 5b illustrates a flow diagram of MS operations 550 in a stage two (2) of a two-stage ZFBF to compute a precoding matrix for use in a wireless communications system, wherein a BS may support up to two active MSs. MS operations 550 may be an exemplary implementation of the stage X of a multi-stage ZFBF discussed previously.

MS operations 550 may begin with the MS receiving broadcast information $PMI^{max}$ (block 555). The MS may make use of the received information to refine its codebook W (block 560). The i-th codeword of the refined codebook, denoted by $w_{22}^i$, is given as $w_{22}^i = w_2^i - w_2^i (w_1^{max})^H w_1^{max}$, where $w_2^i$ is the i-th codeword of the refined codebook.

After refining the codebook, the MS may search the refined codebook for a codeword that will maximize the SINR (block 565). The maximized SINR of the MS may be obtained as $$SINR_{j2}^{max} = \max\left(\frac{|(w_{22}^i)' h_2^{max}(X)|^2}{N(X) + |(w_1^{max})' h_2^{max}(X)|^2}, i \in [1, \ldots, K_2]\right),$$

where $w_{22}^i$ is the i-th codeword of the refined codebook, $h_2^{max}(X)$ is a maximum equivalent channel, and N(X) is a background noise plus inter-cell interference at X-th frame.

The MS may transmit the maximum SINR ($SINR_{j2}^{max}$) and a codeword index corresponding to the maximum SINR ($PMI_{j2}^{max}$) back to the BS (block 570). According to an alternate embodiment, instead of finding the codeword that maximizes the SINR, the MS may select a codeword that first results in the SINR exceeding a threshold. By reporting the first codeword that results in the SINR exceeding a threshold, the MS may more rapidly report the SINR and the codeword index back to the BS, which may help to improve two-stage ZFBF performance. MS operations 550 may then terminate. Furthermore, SNR may be used in place of SINR.

Optionally, MS operations 550 may include the MS acquiring the CSI of a DL between the BS and the MS. If the MS does not acquire the CSI of the DL between the BS and the MS, then the MS may use the CSI acquired during MS operations 500, for example.

Figure 6A:
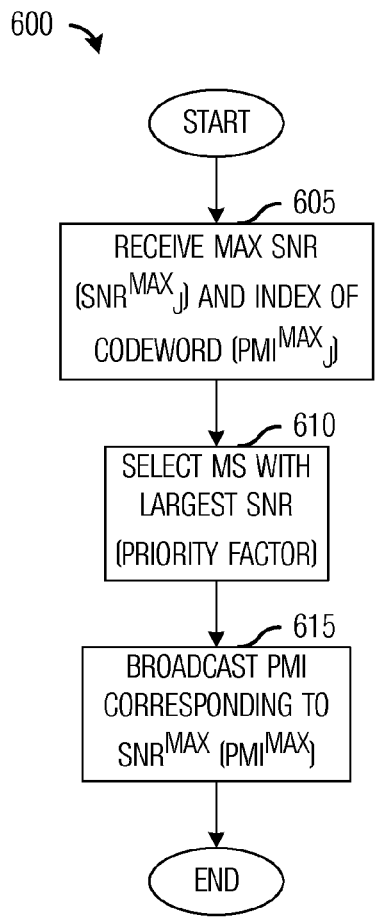
FIGS. 6a and 6b are flow diagrams of base station operations during a first stage and a second stage of a multi-stage zero forcing beamforming.

FIG. 6a illustrates a flow diagram of BS operations 600 in a stage one (1) of a two-stage ZFBF to compute a precoding matrix for use in a wireless communications system, wherein the BS may support up to two active MSs. BS operations 600 may be an exemplary implementation of the initial stage of a multi-stage ZFBF discussed previously.

BS operations 600 may begin with the BS receiving the maximum SNR ($SNR_j^{max}$) and a codeword index corresponding to the maximum SNR ($PMI_j^{max}$) from the MSs (block 605). The BS may select from the received information to select a MS with the largest priority factor (a value based on SNR) (block 610). The priority factor may be computed as $$PF_1^{max} = \max\left(\frac{\log(1+SNR_j^{max})^\alpha}{R_j^\beta}, j \in [1, \ldots, N_1]\right),$$

where $\alpha$ and $\beta$ are fairness parameters, $R_j$ represents the average throughput of MS j and $N_1$ represents number of MSs providing feedback information. A MS associated with $PF_1^{max}$ is denoted by $MS_1^{max}$.

The BS may then broadcast PMI corresponding to $SNR^{max}$, denoted by $PMI^{max}$, is broadcasted (block 615). It is assumed that the codeword in the codebook corresponding to $PMI^{max}$ is denoted by $w_1^{max}$. BS operations 600 may then terminate.

Figure 6B:
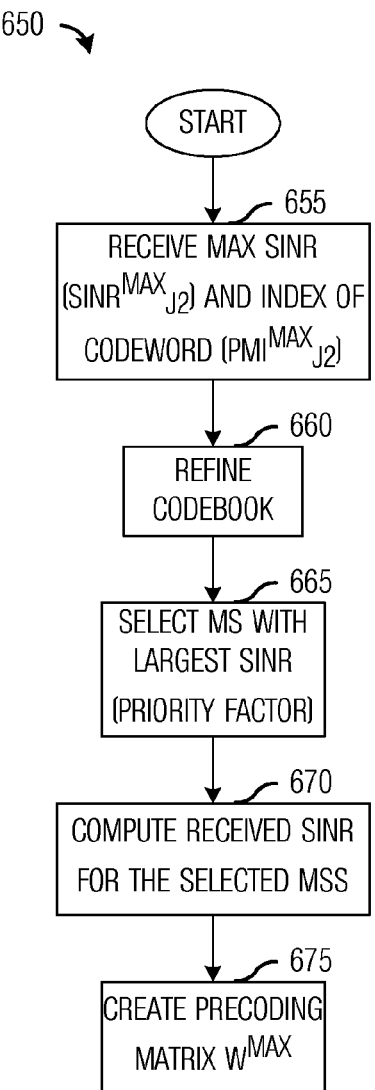

FIG. 6b illustrates a flow diagram of MS operations 650 in a stage two (2) of a two-stage ZFBF to compute a precoding matrix for use in a wireless communications system, wherein the BS may support up to two active MSs. BS operations 650 may be an exemplary implementation of the stage X of a multi-stage ZFBF discussed previously.

BS operations 650 may begin with the BS receiving the maximum SINR ($SINR_{j2}^{max}$) and a codeword index corresponding to the maximum SINR ($PMI_{j2}^{max}$) from the MSs (block 655). The BS may then refine its codebook based on the received information (block 660). The BS may select from the received information to select a MS with the largest priority factor (a value based on SINR) (block 665). The priority factor may be computed as $$PF_2^{max} = \max\left(\frac{\log(1+SINR_{j2}^{max})^\alpha}{R_j^\beta}, j \in [1, \ldots, N_2]\right),$$

where $N_2$ represents number of MSs providing feedback information. It is assumed that the codeword in the refined codebook corresponding to $PF_2^{max}$ is denoted by $w_{22}^{max}$. The MS associated with $PF_2^{max}$ is denoted by $MS_2^{max}$.

The BS may then compute a received SINR for both selected MSs (one MS selected in block 665 and one MS selected in block 610 of BS operations 600) (block 670). Then, the received SINR of $MS_1^{max}$ is given by $$SINR_1^{max} = \frac{|(w_1^{max})'h_1^{max}(X)|^2}{N(X) + |(w_{22}^{max})'h_1^{max}(X)|^2},$$

and the received SINR of $MS_2^{max}$ is given by $$SINR_1^{max} = \frac{|(w_{22}^{max})'h_2^{max}(X)|^2}{N(X) + |(w_1^{max})'h_2^{max}(X)|^2},$$

where $h_1^{max}$ and $h_2^{max}$ are beamforming vectors corresponding to $MS_1^{max}$ and $MS_2^{max}$.

The BS may then create the precoding matrix $w^{max}$ (block 675). The precoding matrix $w^{max}$ may be created from information of the selected MSs. BS operations 650 may then terminate.

Figure 7:
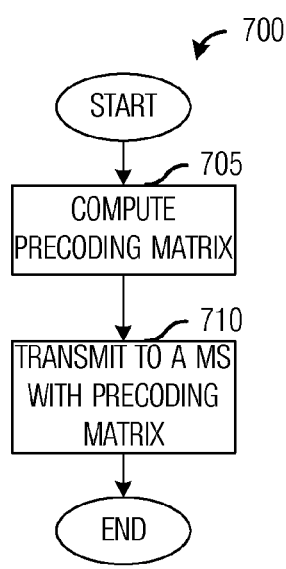
FIG. 7 is a flow diagram of base station operations in communicating with a mobile station.

FIG. 7 illustrates a flow diagram of BS operations 700 in communicating with a MS. BS operations 700 may be descriptive of operations occurring in a BS as the BS is communicating with a MS in a wireless communications system. BS operations 700 may occur continually while the BS is operating normally.

BS operations 700 may begin with the BS computing a precoding matrix (block 705). As discussed above, the BS may perform a multi-stage ZFBF in order to compute the precoding matrix. The multi-stage ZFBF utilizes the MSs themselves to compute terms of the precoding matrix, which may help to reduce (or eliminate) a problem with quantization error accumulation as well as improve SINR estimation accuracy. A number of stages in the multi-stage ZFBF may be a function of a number of active MSs that the BS is capable of actively supporting. Alternatively, the number of stages in the multi-stage ZFBF may be fixed at a specified number, where the specified number is less than the number of active MSs that the BS is capable of actively supporting.

After computing the precoding matrix, the BS may make transmissions to MSs, wherein a transmission to a MS makes use of an entry in the precoding matrix corresponding to the MS (block 710). The transmission to the MS may be multiplied with the entry in the precoding matrix corresponding to the MS prior to transmission. BS may continue transmitting to the MSs with periodic recomputation of the precoding matrix, with the periodicity being a specified value.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing zero forcing beamforming at a base station (BS) of a wireless communications system, the method comprising:

receiving feedback information from each mobile station (MS) in a first plurality of mobile stations (MSs);

selecting a first MS from the first plurality of MSs, wherein the first MS having a largest value of a first metric based on the feedback information received from the first plurality of MSs;

broadcasting information related to the first MS to the first plurality of MSs;

receiving feedback information from each MS in a second plurality of MSs, wherein the second plurality of MSs is a subset of the first plurality of MSs;

selecting a second MS from the second plurality of MSs, wherein the second MS having a largest value of a second metric based on the feedback information received from the second plurality of MSs; and creating a precoding matrix from feedback information from the first MS and the second MS,
wherein the first metric comprises $$PF_1^{max} = \max\left(\frac{\log(1 + SNR_j^{max})^\alpha}{R_j^\beta}, j \in [1, \ldots, N_1]\right),$$

where $PF_1^{max}$ is a first priority factor, $SNR_j^{max}$ is a SNR reported by the MS j, $\alpha$ and $\beta$ are fairness parameters, $R_j$ represents an average throughput of MS j and $N_1$ represents number of MSs in the first plurality of MSs.

2. The method of claim 1, wherein the second plurality of MSs is smaller than the first plurality of MSs.

3. The method of claim 1, further comprising refining a codebook based on the received feedback information from each MS in the second plurality of MSs.

4. The method of claim 1, wherein the feedback information comprises a channel quality indicator (CQI) and an index to a codebook, the index indicating a quantized beamforming vector.

5. The method of claim 4, wherein the CQI feedback by each MS comprises a signal to noise ratio (SNR) measured by the MS, and wherein the selecting the first MS comprises:
computing the first metric based on the SNR; and
selecting the first MS from the first plurality of MSs as the first MS, wherein the SNR of the MS resulted in the largest value of the first metric.

6. The method of claim 5, wherein the selecting the first MS comprises selecting a MS in the first plurality of MSs having the largest CQI as the first MS.

7. The method of claim 4, wherein the CQI fedback by each MS comprises a signal and interference to noise ratio (SINR) measured by the MS, and wherein the selecting the second MS comprises:
computing the second metric based on the SINR; and
selecting the second MS from the second plurality of MSs as the second MS, wherein the SINR of the MS resulted in the largest value of the second metric.

8. The method of claim 5, wherein the selecting the second MS comprises selecting a MS in the second plurality of MSs having the largest CQI as the first MS.

9. A method for performing zero forcing beamforming at a base station (BS) of a wireless communications system, the method comprising:
receiving feedback information from each mobile station (MS) in a first plurality of mobile stations (MSs);
selecting a first MS from the first plurality of MSs, wherein the first MS having a largest value of a first metric based on the feedback information received from the first plurality of MSs;
broadcasting information related to the first MS to the first plurality of MSs;
receiving feedback information from each MS in a second plurality of MSs, wherein the second plurality of MSs is a subset of the first plurality of MSs;
selecting a second MS from the second plurality of MSs, wherein the second MS having a largest value of a second metric based on the feedback information received from the second plurality of MSs; and creating a precoding matrix from feedback information from the first MS and the second MS, wherein the second metric comprises $$PF_2^{max} = \max\left(\frac{\log(1 + SINR_{j2}^{max})^\alpha}{R_j^\beta}, j \in [1, \ldots, N_2]\right),$$

where $PF_2^{max}$ is a second priority factor, $SINR_{j2}^{max}$ is a SINR reported by the MS j, $\alpha$ and $\beta$ are fairness parameters, $R_j$ represents an average throughput of MS j and $N_2$ represents number of MSs in the second plurality of MSs.

10. A method utilizing zero forcing beamforming at a mobile station (MS) of a wireless communications system, the wireless communications system having a base station (BS), the method comprising:
a) measuring a channel state information (CSI) of a communications channel between the BS and the MS;
b) selecting a first codeword from a codebook representing a quantized version of the CSI;
c) transmitting an index of the first codeword and channel quality information (CQI) corresponding to the first codeword to the BS;
d) receiving an indication of a selected MS from the BS;
e) refining the codebook based on the indication;
f) selecting a second codeword representing a quantized version of the CSI from the refined codebook; and
g) transmitting an index of the second codeword and channel quality information (CQI) corresponding to the second codeword to the BS, wherein the selecting the first codeword comprises selecting the first codeword from the codebook that maximizes a computed signal to noise ratio (SNR), and wherein computing the SNR is expressible as $$SNR_j^{max} = \max\left(\frac{|(w_1^i)'h_j(X)|^2}{N(X)}, i \in [1, \ldots, K_1]\right),$$

where $w_l^i$ is the i-th codeword in the codebook, $N(X)$ is a background noise plus inter-cell interference at X-th frame and $h_j(X)$ is a beamforming vector of MS j, and X is a frame number.

11. A method utilizing zero forcing beamforming at a mobile station (MS) of a wireless communications system, the wireless communications system having a base station (BS), the method comprising:
a) measuring a channel state information (CSI) of a communications channel between the BS and the MS;
b) selecting a first codeword from a codebook representing a quantized version of the CSI;
c) transmitting an index of the first codeword and channel quality information (CQI) corresponding to the first codeword to the BS;
d) receiving an indication of a selected MS from the BS;
e) refining the codebook based on the indication;
f) selecting a second codeword representing a quantized version of the CSI from the refined codebook; and
g) transmitting an index of the second codeword and channel quality information (CQI) corresponding to the second codeword to the BS, wherein the selecting a second codeword comprises selecting the second codeword from the codebook that maximizes a computed signal and interference to noise ratio (SINR), and wherein computing the SINR is expressible as $$SINR_{j2}^{max} = \max\left(\frac{|(w_{22}^{max})' h_2^{max}(X)|^2}{N(X) + |(w_1^{max})' h_2^{max}(X)|^2}, i \in [1, \ldots, K_2]\right),$$

where $w^1_{22}$ is the i-th codeword in the refined codebook, $N(X)$ is a background noise plus intercell interference at X-th frame and $h_2^{max}(X)$ is a maximum equivalent channel, and X is a frame number.

* * * * *